United States Patent
Baillargeon et al.

(10) Patent No.: US 9,628,254 B2
(45) Date of Patent: Apr. 18, 2017

(54) TAIL END MBMS BEARER FAULT MANAGEMENT

(71) Applicants: Steve Baillargeon, Gatineau (CA); Prabaharan Kanesalingam, Ottawa (CA)

(72) Inventors: Steve Baillargeon, Gatineau (CA); Prabaharan Kanesalingam, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 96 days.

(21) Appl. No.: 14/644,831

(22) Filed: Mar. 11, 2015

(65) Prior Publication Data
US 2015/0263847 A1    Sep. 17, 2015

Related U.S. Application Data

(60) Provisional application No. 61/951,472, filed on Mar. 11, 2014.

(51) Int. Cl.
| | | |
|---|---|---|
| *H04L 7/00* | (2006.01) | |
| *H04L 12/24* | (2006.01) | |
| *H04L 29/06* | (2006.01) | |
| *H04W 24/04* | (2009.01) | |

(52) U.S. Cl.
CPC .......... *H04L 7/0008* (2013.01); *H04L 41/064* (2013.01); *H04L 65/608* (2013.01); *H04W 24/04* (2013.01)

(58) Field of Classification Search
None
See application file for complete search history.

(56) References Cited

U.S. PATENT DOCUMENTS

| | | | |
|---|---|---|---|
| 7,315,509 B2 | 1/2008 | Jeong et al. | |
| 7,644,317 B1 | 1/2010 | Sajassi et al. | |
| 8,725,890 B2 | 5/2014 | Liu et al. | |
| 2012/0099419 A1* | 4/2012 | Kim | H04L 1/1854 370/216 |
| 2013/0242716 A1* | 9/2013 | Amerga | H04W 76/027 370/216 |

OTHER PUBLICATIONS

Alcatel-Lucent et al., "DISC-MBMS restoration upon SGI-mb path fai," 3GPP Draft: C 4-131586, CT WWG4 (Sep. 2013), pp. 1-29. [Corresponds to PCT/IB2015/051780].

(Continued)

*Primary Examiner* — Brian Roberts
(74) *Attorney, Agent, or Firm* — David Rahmer; Ericsson Canada Inc.

(57) ABSTRACT

Systems and methods are provided for managing faults at the tail end of the user plane associated with an MBMS bearer. A fault detection time interval associated with the MBMS bearer can be defined and monitored. A fault can be detected in response to determining that the defined time interval has elapsed without receipt of a synchronization packet. Mechanisms for detecting, indicating, localizing and repairing MBMS bearer faults are described.

28 Claims, 13 Drawing Sheets

(56) References Cited

OTHER PUBLICATIONS 13. 3GPP, "Restoration Procedures," Technical Specification Group Core Network and Terminals: Technical Specification, TS 23.007, V12.4.0 (Mar. 2014), pp. 1-85. [Corresponds to PCT/IB2015/051780].
PCT International Search Report from corresponding application PCT/IB2015/051780.
3GPP, "Evolved Universal Terrestrial Radio Access (E-UTRA) and Evolved Universal Terrestrial Radio Access Network (E-UTRAN): Overall Description," Technical Specification Group Radio Access Network: TS 36.300, V12.0.0 (Dec. 2013), pp. 1-208.
3GPP, "Evolved Universal Terrestrial Radio Access Network (E-UTRAN): M2 Application Protocol (M2AP)," Technical Specification Group Radio Access Network: TS 36.443, V11.3.0 (Jun. 2013), pp. 1-84.
3GPP, "Evolved Universal Terrestrial Radio Access Network (E-UTRAN): M3 Application Protocol (M3AP)," Technical Specification Group Radio Access Network: TS 36.444, V11.6.0 (Jun. 2013), pp. 1-63.
3GPP, "MBMS synchronisation protocol (SYNC)," Technical Specification Group Radio Access Network: TS 25.446, V11.0.0 (Sep. 2012), pp. 1-22.
3GPP, "General Packet Radio System (GPRS) Tunnelling Protocol User Plane (GTPv1-U)," Technical Specification Group Radio Access Network: TS 29.281, V11.6.0 (Mar. 2013), pp. 1-27.
S. Bhattacharyya, "An Overview of Source-Specific Multicast (SSM)," The Internet Society: Network Working Group, RFC 3569 (Jul. 2003), pp. 1-14.
B. Fenner et al., "Protocol Independent Multicast—Sparse Mode (PIM-SM): Protocol Specification (Revised)," The Internet Society: Network Working Group, RFC 4601 (Aug. 2006), pp. 1-150.
B. Cain et al., "Internet Group Management Protocol, Version 3," The Internet Society: Network Working Group, RFC 3376 (Oct. 2002), pp. 1-53.
R. Vida et al., "Multicast Listener Discovery Version 2 (MLDv2) for IPv6," The Internet Society: Network Working Group, RFC 3810 (Jun. 2004), pp. 1-62.
D. Katz et al., "Bidirectional Forwarding Detection (BFD)," IETF: Internet Engineering Task Force, RFC 5880 (Jun. 2010), pp. 1-49. (ISSN: 2070-1721).
D. Katz et al., "BFD for Multipoint Networks draft-ietf-bfd-multipoint-03.txt," IETF: Internet Engineering Task Force (Feb. 2014), pp. 1-29.
S. Shalunov et al. "A One-way Active Measurement Protocol (OWAMP)," The Internet Society: Network Working Group, RFC 4656 (Sep. 2006), pp. 1-56.

\* cited by examiner

TAIL END MBMS BEARER FAULT MANAGEMENT

CROSS REFERENCE TO RELATED APPLICATIONS

This application claims the benefit of priority to previously filed U.S. Provisional Patent Application No. 61/951,472 entitled "Tail End MBMS Bearer Fault Management" and filed on Mar. 11, 2014, the contents of which are incorporated herein by reference.

TECHNICAL FIELD

This disclosure relates generally to Multimedia Broadcast/Multicast Service (MBMS), and in particular, the present disclosure relates to systems and methods for detecting, indicating, localizing and repairing MBMS bearer faults.

BACKGROUND

Multimedia Broadcast/Multicast Service (MBMS) is a broadcasting service offered via cellular networks including Wideband Code Division Multiple Access (WCDMA) and Long Term Evolution (LTE). MBMS is a point-to-multipoint or multicast service in which data is transmitted from a single source entity to multiple destination recipients. The MBMS service can be used for both file download and for streaming services, such as Mobile TV. Enhanced MBMS (eMBMS) is used to denominate an MBMS service in Evolved Packet Systems including the Evolved UMTS Terrestrial Radio Access Network (E-UTRAN) or Long Term Evolution (LTE). In the present disclosure, the term MBMS is used generally to refer to either or both of the MBMS and eMBMS services.

The MBMS network architecture, node functions, control plane protocol architecture and user plane protocol architecture are defined in "E-UTRAN overall description", 3GPP TS 36.300 ("TS 36.300"), which is incorporated by reference in its entirety herein. An example embodiment of this architecture is illustrated in FIG. 1, which shows the MBMS deployment in an LTE network with a distributed Multi-Cell/Multicast Coordination Entity (MCE) architecture, where the MCE is distributed and co-located with each E-UTRAN NodeB (eNB).

A Broadcast-Multicast Service Center (BM-SC) 100 originates the MBMS session, using content from at least one content provider 102. The BM-SC is connected to user plane (UP) 104 and control plane (CP) 106 components of at least one MBMS Gateway (MBMS-GW) 108 by an SGi-mb UP interface 110 and an SGmb CP interface 112 respectively. The CP component 106 of the MBMS-GW 108 is connected to a Mobile Management Entity (MME) 114 along a Sm CP interface 116.

The SGi-mb 110, SGmb 112 and Sm 116 interfaces run over a unicast internet protocol (IP) (either IPv4 or IPv6) network.

In some example embodiments, the BM-SC 100 can be connected to a public data network (PDN) gateway 118 by an SGi interface 120.

The MME 114 communicates with the MCE 122a/122b in an eNB 124a/124b along an M3 CP interface 126a/126b. Two eNBs 124a/124b are shown in the network for exemplary purposes. The UP component 104 of the MBMS-GW 108 communicates with the MCE 122a/122b along an M1 interface 128a/128b. The E-UTRAN M3 Application Protocol is described in 3GPP TS 36.444 ("TS 36.444"), which is incorporated by reference in its entirety herein.

The CP interfaces are the SGmb 112, Sm 116 and M3 126a/126b interfaces. The CP interfaces do not carry any user data but are responsible for the signaling procedures to establish or terminate MBMS sessions along unicast IP (either IPv4 or IPv6) networks.

The UP interfaces are the SGi-mb 110 and M1 128a/128b interfaces. The M1 interface 128a/128b is responsible for establishing the multicast listening and Protocol Independent Multicast (PIM) protocol states, as well as the related shortest path distribution tree carrying the MBMS user data and synchronization data.

Each eNB 124a/124b may be connected along a E-UTRAN Uu interface 130 with at least one user equipment (UE) 132. One UE 132 is shown for exemplary purposes.

FIG. 2 illustrates an alternative example embodiment of the MBMS deployment in an LTE network, in which the MCE is not co-located with each eNB, but rather is a stand-alone component or optionally part of another network element (not shown), leading to a centralized MCE architecture.

In the embodiment of FIG. 2, the centralized MCE 134 communicates with the MME 114 along an M3 CP interface 126c, while the MCE 134 communicates with each eNB 124a/124b along an M2 CP interface 136a/136b. The E-UTRAN M2 Application Protocol, described in 3GPP TS 36.443 ("TS 36.443"), which is incorporated by reference in its entirety herein, also does not carry any user data and runs over unicast IP (IPv4 or IPv6) networks.

As with FIG. 1, the UP component 104 of the MBMS-GW 108 communicates with each eNB 124a/124b along an M1 UP interface 128a/128b.

FIG. 3 illustrates an example embodiment of data (user plane) traffic through the example embodiments shown in FIGS. 1 and 2. MBMS packets are encapsulated in MBMS Synchronization Protocol (SYNC) Protocol Data Units (PDUs), described in "MBMS Synchronization Protocol (SYNC)", 3GPP TS 25.446 ("TS 25.446"), which is incorporated by reference in its entirety herein.

One SYNC instance 140 is supported per MBMS bearer. The SYNC protocol terminates at the eNB 124a, which is responsible for transmitting the MBMS packet 142 over the Uu interface 130 to the UE 132.

The MBMS-GW 108 allocates a GPRS Tunneling Protocol (GTP) User (GTP-U) tunnel 144 for each MBMS bearer. The GTP-U tunneling protocol is described in "GPRS Tunneling Protocol User Plane (GTPv1-U)", 3GPP TS 29.281 ("TS 29.281"), which is incorporated by reference in its entirety herein. In some example embodiments, at the eNB 124a, the socket used for terminating all GTP multicast tunnels is UDP port 2152.

The MBMS bearer runs over an IP multicast network 146 using a source-specific multicast (SSM) channel, described in "An Overview of Source-Specific Multicast", IETF RFC 3569 ("RFC 3569"), which is incorporated by reference in its entirety herein, where the source of the SSM channel is the MBMS-GW 108. Each SSM channel is a unidirectional shortest path distribution tree from a specific source IP address. Each SSM channel is uniquely identified by, in some example embodiments, the combination of an SSM destination address G (a multicast IPv4 address in the range 232/8 or a multicast IPv6 address with prefix FF3x::/32) and a source IP address S (an IPv4 or IPv6 unicast address belonging to the MBMS-GW). The SSM channel is constructed by PIM routers using the PIM sparse mode (SM)

(PIM-SM) protocol described in "Protocol Independent Multicast—Sparse Mode", IETF RFC 4601 ("RFC 4601"), which is incorporated by reference in its entirety herein.

The eNB 124a requests interest in receiving IP multicast packets for a specific SSM channel. Accordingly, the eNB124a is considered an SSM receiver or listener. It uses the Internet Group Management Protocol (IGMP) Version 3 (IGMPv3) protocol or the Multicast Listener Discover (MLD) Version 2 (MLDv2) protocol to communicate with the PIM routers. The IGMPv3 protocol is described in "Internet Group Management Protocol Version 3 (IGMPv3)", IETF RFC 3810 ("RFC 3810"), which is incorporated by reference in its entirety herein, and the MLDv2 protocol is described in "Multicast Listener Discovery Version 2 (MLDv2)", IETF RFC 3810 ("RFC 3810"), which is incorporated by reference in its entirety herein.

An MBMS bearer can be local, regional or national in reach, and may span more than a thousand eNBs and a considerably larger number of UEs connected to these eNBs.

The lack of user plane connectivity monitoring and fault indication between an eNB and a BM-SC can directly impact MBMS service deployment in mobile operator networks because of concerns with performance degradation and potential holes in the multicast service coverage. Any link, node, multicast state or reverse path forwarding (RPF) failure in the IP multicast network can potentially cause undetected MBMS service interruption.

Operators have attempted to address these concerns by adding redundancy to the IP multicast network, where economically feasible, in order to re-route traffic under specific and well-known failure scenarios. Such redundancy schemes, however, are expensive and may not address all possible failure cases, especially those failures that may not be easily detectable at the physical (link) layer.

3GPP specifications do not address methods for the system to detect an M1 user plane interface loss of connectivity or MBMS bearer loss of service continuity to a specific eNB.

The SYNC and GTP-U protocols do not provide any fault detection mechanisms for multicast bearers. For example, TS 29.281 provides that bidirectional GTP-U path management messages such as, by way of non-limiting example, Echo Request and/or Echo Response shall not be used for MBMS IP multicast distribution.

In any event, existing bidirectional echoes or pings may not provide an accurate view of the multicast network connectivity since the set of eNB receivers may be unknown to the MBMS-GW (source) sender, which is provided neither the number nor the identity of the eNB receivers (destination).

The Bidirectional Forwarding Detection (BFD) protocol described by the IETF in "Bidirectional Forwarding Detection", RFC 5880 ("RFC 5880"), which is incorporated by reference in its entirety herein, may be used to monitor IP unicast connectivity between two BFD-capable nodes. Unicast BFD can detect a link failure between two direct peers and immediately notify the unicast or multicast routing table. Such failure detection will trigger the PIM-SM protocol running on these nodes to send and propagate PIM joint messages upstream over an alternate path towards the source S, in order to reconstruct the (S,G) multicast tree state, in order to forward the MBMS packets around the link failure.

However, unicast BFD makes use of a BFD session on each link in the network. The use of such BFD capability is not available in conjunction with IP multicast communications on many routers. As well, BFD does not detect many UP problems, such as, by way of non-limiting example, multicast channel state and RPF failure, that could impact the end-to-end MBMS UP bearer, including, without limitation, internal faults at the head or tail of the MBMS service, within the MBMS-GW or eNB respectively.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for fault management on a unidirectional user plane interface of a Multimedia Broadcast/Multicast Service (MBMS) bearer for point-to-multipoint delivery of MBMS traffic from a source node to at least one destination node. The method can be performed by a destination node. The method comprises the steps of defining a fault detection time interval associated with the MBMS bearer. A timer is started responsive to receiving a first synchronization packet from the source node over the unidirectional user plane interface. A fault is detected on the unidirectional user plane interface responsive to determining that the timer exceeds the fault detection time interval and a subsequent synchronization packet has not been received during the fault detection time interval.

In a second aspect of the present invention, there is provided a network node for managing faults on a unidirectional user plane interface of a Multimedia Broadcast/Multicast Service (MBMS) bearer for point-to-multipoint delivery of MBMS traffic from a source node to at least one destination node. The network node comprises a processor and a memory, the memory containing instructions executable by the processor whereby the network node is operative to define a fault detection time interval associated with the MBMS bearer. The network node if operative to start a timer in response to receiving a first synchronization packet from the source node over the unidirectional user plane interface. The network node is operative to detect a fault on the unidirectional user plane interface in response to determining that the timer exceeds the fault detection time interval and a subsequent synchronization packet has not been received during the fault detection time interval.

In another aspect of the present invention, there is provided a fault manager comprising a time interval module, a packet reception module, a timer module, and a fault detection module. The time interval module is configured for defining a fault detection time interval associated with a Multimedia Broadcast/Multicast Service (MBMS) bearer. The packet reception module is configured for receiving a first synchronization packet from a source node over a unidirectional user plane interface of the MBMS bearer. The timer module is configured for starting a timer responsive to receiving the first synchronization packet. The fault detection module is configured for detecting a fault on the unidirectional user plane interface responsive to determining that the timer exceeds the fault detection time interval and a subsequent synchronization packet has not been received during the fault detection time interval.

In some embodiments, the fault detection time interval is defined in accordance with an MBMS SYNC synchronization sequence. The fault detection time interval can be defined to exceed a multiple of the MBMS SYNC synchronization sequence.

In some embodiments, the timer can be reset responsive to receiving a second synchronization packet, from the source node, over the unidirectional user plane interface.

In some embodiments, the first synchronization packet can be a SYNC control protocol data unit (SYNC PDU) Type 0 or a SYNC control protocol data unit (SYNC PDU) Type 3. In some embodiments, the first synchronization packet is received over the unidirectional user plane interface regardless of MBMS bearer activity.

In some embodiments, responsive to detecting the fault on the unidirectional user plane interface, a fault indication message is transmitted to a mobility management entity over a control plane interface. The fault indication message can be transmitted to the mobility management entity for correlation with at least one other fault indication message. The fault indication message can be transmitted to the mobility management entity for generating a reduced number of fault notifications associated with the MBMS bearer to a network management entity.

In some embodiments, additional synchronization packets can be received over the unidirectional user plane interface after detecting the fault. The number of received additional synchronization packets can be counted. A fault recovery of the unidirectional user plane interface can be detected in response to determining that the counted number exceeds a predetermined threshold of received additional synchronization packets. In some embodiments, responsive to detecting the fault recovery, a fault recovery message is transmitted to a mobility management entity over a control plane interface.

In some embodiments, responsive to detecting the fault, at least one IP multicast channel membership action is initiated without releasing the MBMS bearer. A first IP multicast channel membership action can include sending a subscribe message to a neighboring multicast router requesting to listen to the IP multicast channel associated with the MBMS bearer. The subscribe message can be selected from a group consisting of an IGMPv3 Membership Report and an MLDv2 State Change Report Stage. The subscribe message is sent to trigger the neighboring multicast router to update its multicast address listener state and to send a join message towards a next upstream multicast router.

In some embodiments, a second IP multicast channel membership action can include sending an unsubscribe message to a neighboring multicast router requesting to stop listening to the IP multicast channel associated with the MBMS bearer; and sending, after a predetermined period of time, a second subscribe message to the neighboring multicast router requesting to listen to the IP multicast channel associated with the MBMS bearer. The unsubscribe message and/or the second subscribe message can be selected from a group consisting of an IGMPv3 Membership Report and an MLDv2 State Change Report Stage. The unsubscribe message can be sent to trigger the neighboring multicast router to delete its multicast address listener state and to send a prune message towards a next upstream multicast router. The second subscribe message is sent to trigger the neighboring multicast router to re-create its multicast address listener state and to send a join message towards a next upstream multicast router.

The various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
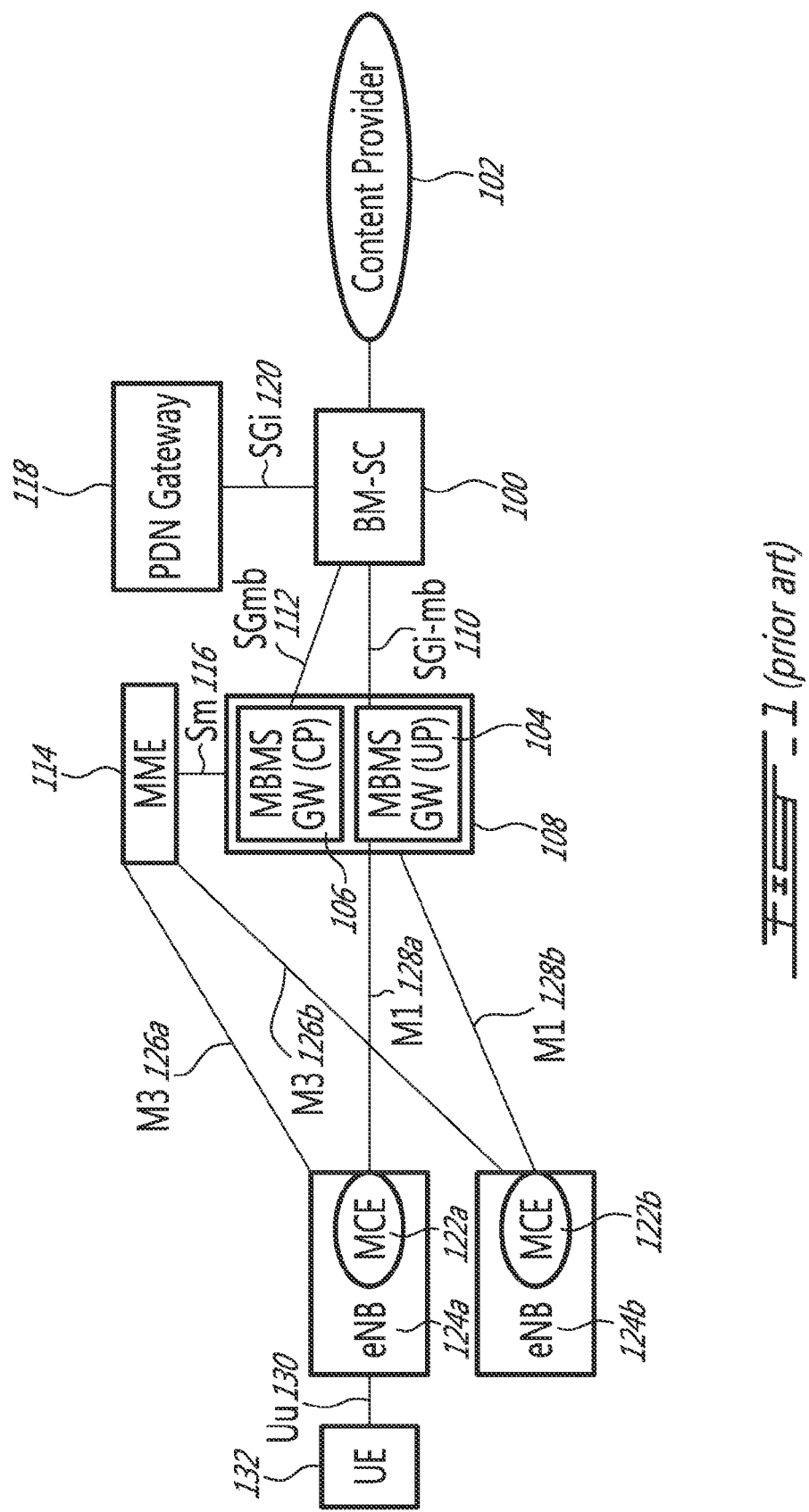
FIG. 1 is an example embodiment of MBMS deployment in an LTE network with a distributed MCE architecture.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the present disclosure are directed towards systems and methods for managing faults on a user plane interface associated with a MBMS bearer.

A method has been proposed in "BFD For Multipoint Networks", IETF draft-ietf-bfd-multipoint-03.txt ("Multipoint BFD"), which is incorporated by reference in its entirety herein, for verifying the end-to-end unidirectional multicast connectivity between heads and tails using BFD, but this method is at present, neither standardized nor available on any known equipment vendor. Moreover, this is unlikely to occur for a number of reasons, including without limitation:

a. the large number of multicast BFD sessions to initiate, configure and maintain on the MBMS-GW and eNBs, given that there would be one multicast BFD session for each MBMS bearer;

b. the consumption of MBMS-GW, eNB and bandwidth resources by the additional control protocol called for, especially with a BFD state scaling issue at the network head (by way of non-limiting example, the MBMS-GW or upstream PIM router); and c. a draft specification where multicast BFD protocol interworking and coordination between different vendors such as, by way of non-limiting example, MBMS-GW and eNB vendors) is currently not envisaged.

A one-way measurement protocol is described by IETF in "A One-Way Active Measurement Protocol (OWAMP)", RFC 4656 ("RFC 4656"), which is incorporated by reference in its entirety herein. This protocol permits troubleshooting network performance. However, there is no indication how to use or apply this protocol in a multicast network.

Both the IETF and 3GPP specify that IGMPv3 and MLDv3 multicast membership protocol actions by the listener (by way of non-limiting example, the eNB) are limited to:

a. the firing of a specific IGMPv3/MLDv2 protocol timer;
b. the reception of a Query message sent by the PIM router; and
c. the listener desiring to listen (or not listen) to a particular SSM channel triggered by an MBMS Session Start or Stop signaling procedure.

Such limitations may constrain an operator from triggering IP multicast protocol actions from the listener that could resolve connectivity issues on one or more eNBs, without releasing the entire MBMS bearer from the core network.

In some embodiments of the present invention, prior to establishing an MBMS bearer, an eNB can be configured with MBMS configuration data including an M1 connectivity status interval for the eNB. In some embodiments, there is an M1 connectivity status interval associated with each MBMS bearer associated with the eNB.

The M1 connectivity status interval is a predetermined time interval considered appropriate to detect a change in connectivity status of the associated MBMS bearer.

In some embodiments, the M1 connectivity status interval can be defined in accordance with an expected MBMS SYNC synchronization sequence. The M1 connectivity status interval can be set to be greater than or equal to a multiple (e.g. three times) of the expected MBMS SYNC synchronization sequence.

In some embodiments, an M1 connectivity status interval of 0 may indicate that the associated MBMS bearer (or eNB) will not be subject to an M1 connectivity check function.

Figure 4:
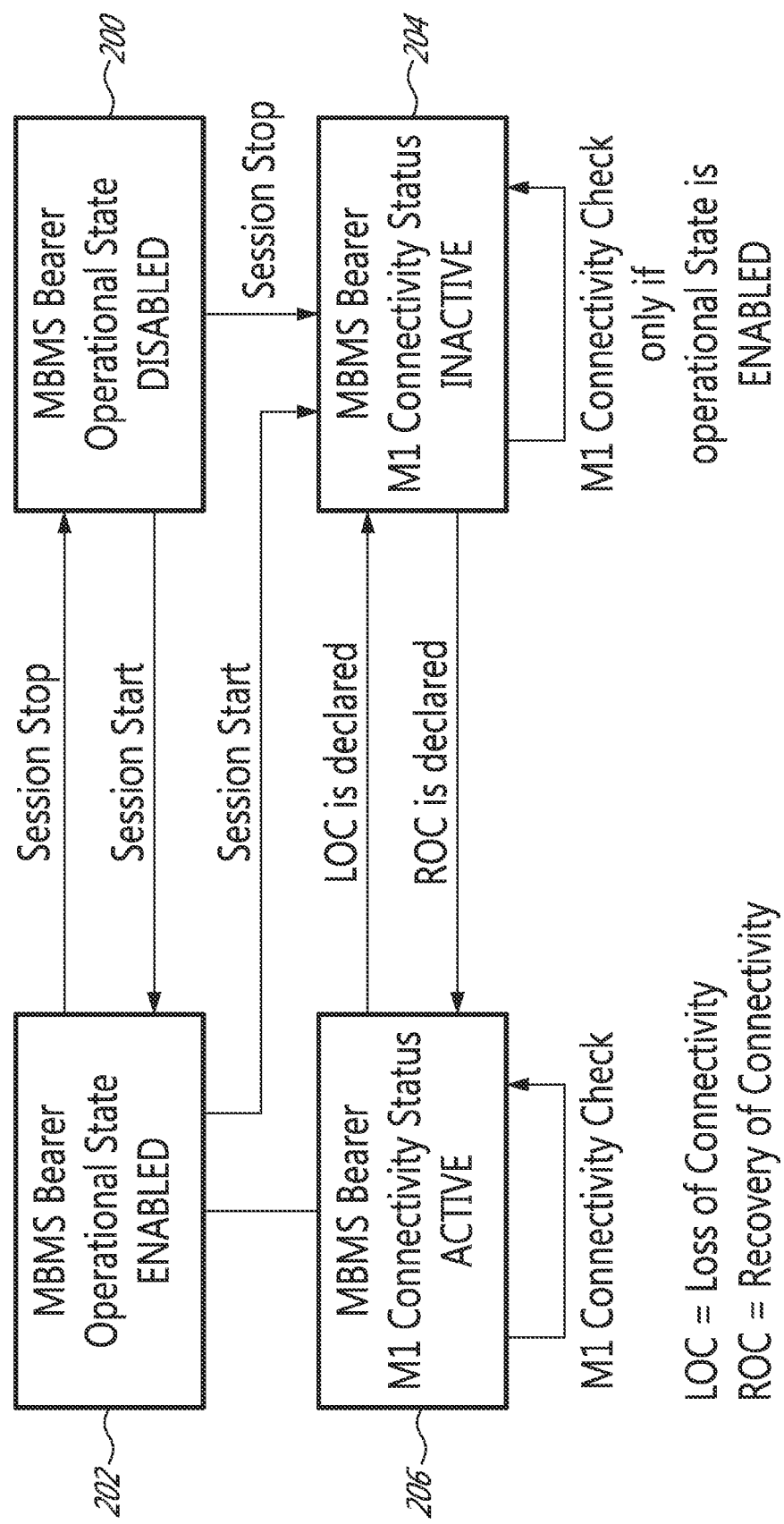
FIG. 4 is an example state diagram of states that may be followed by an eNB for an MBMS bearer.

FIG. 4 illustrates an example state diagram of an MBMS bearer that may be followed by an eNB. There are two states shown, namely the operational state and the connectivity state. Initially, the MBMS bearer operational state is DISABLED 200. After the MBMS bearer has been established, the MBMS bearer session has started and the MBMS bearer operational state moves to ENABLED 202. If the MBMS bearer session is stopped, the MBMS bearer operational state will return to DISABLED 200.

When the MBMS bearer operational state is ENABLED 202, the MBMS bearer connectivity state is set to INACTIVE 204.

Upon establishment of the MBMS bearer, the BM-SC conventionally sends MBMS packets encapsulated into SYNC user data PDUs (for example, SYNC PDU Type 0). Further, in some embodiments, the BM-SC sends a SYNC control PDU (for example, SYNC PDU Type 0 or 3), at the end of each synchronization sequence, which may range from 80 ms, 160 ms, or up to 1024 ms, regardless of the bearer activity.

In some example embodiments, the eNB monitors for receipt or lack of receipt of the incoming SYNC control PDUs for each individual MBMS bearer. Upon receipt of a SYNC control PDU, the MBMS bearer M1 connectivity state is set to ACTIVE 206.

If the connectivity status time interval associated with an MBMS bearer passes between successive received SYNC control PDUs, the MBMS bearer connectivity state returns to INACTIVE 204 and the eNB can declare that a fault has been detected for the MBMS bearer.

In some embodiments, a M1 connectivity status timer is defined and associated with each MBMS bearer. The M1 connectivity status timer can be a countdown timer that is initially set to the associated connectivity status interval. When a SYNC control PDU is received for an MBMS bearer, the eNB can reset the associated M1 connectivity status timer to the associated connectivity status interval. If the M1 connectivity status time counts down to zero, the MBMS bearer connectivity state will return to INACTIVE 204 and the eNB can declare that a fault has been detected for the MBMS bearer.

In some example embodiments, a large interval, which in some embodiments may be greater than substantially 1 s, may be specified if the operator contemplates that the multicast network has a capability of recovering from a connectivity failure at a link or node.

While the MBMS bearer connectivity state is INACTIVE 204, the eNB continues to monitor the MBMS bearer for incoming SYNC control PDUs. In some example embodiments, when a predetermined number of SYNC control PDU Type 0 or Type 3 packets is received from the BM-SC within the connectivity status interval, the MBMS bearer connectivity state returns to ACTIVE 206 and the eNB can declare that recovery of connectivity has been detected for the MBMS bearer. In some example embodiments, the predetermined number of packets may be three.

In some embodiments of the present invention, when an eNB detects a loss of connectivity for an MBMS bearer, the eNB can send a fault indication message such as, by way of non-limiting example, an M1 FAILURE INDICATION message, to a mobility management entity such as the MME.

Figure 2:
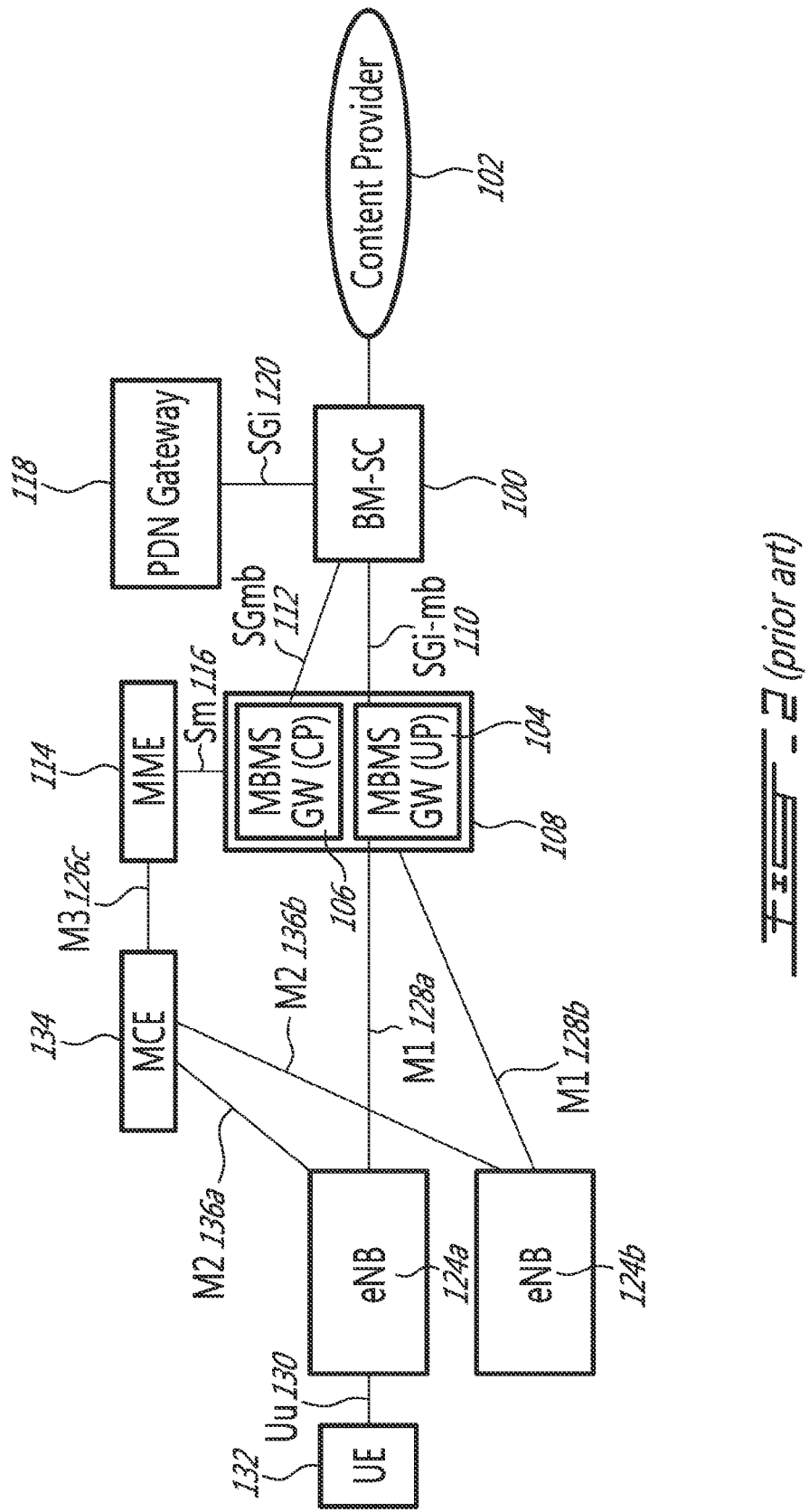
FIG. 2 is an example embodiment of MBMS deployment in an LTE network with a centralized MCE architecture.
Figure 3:
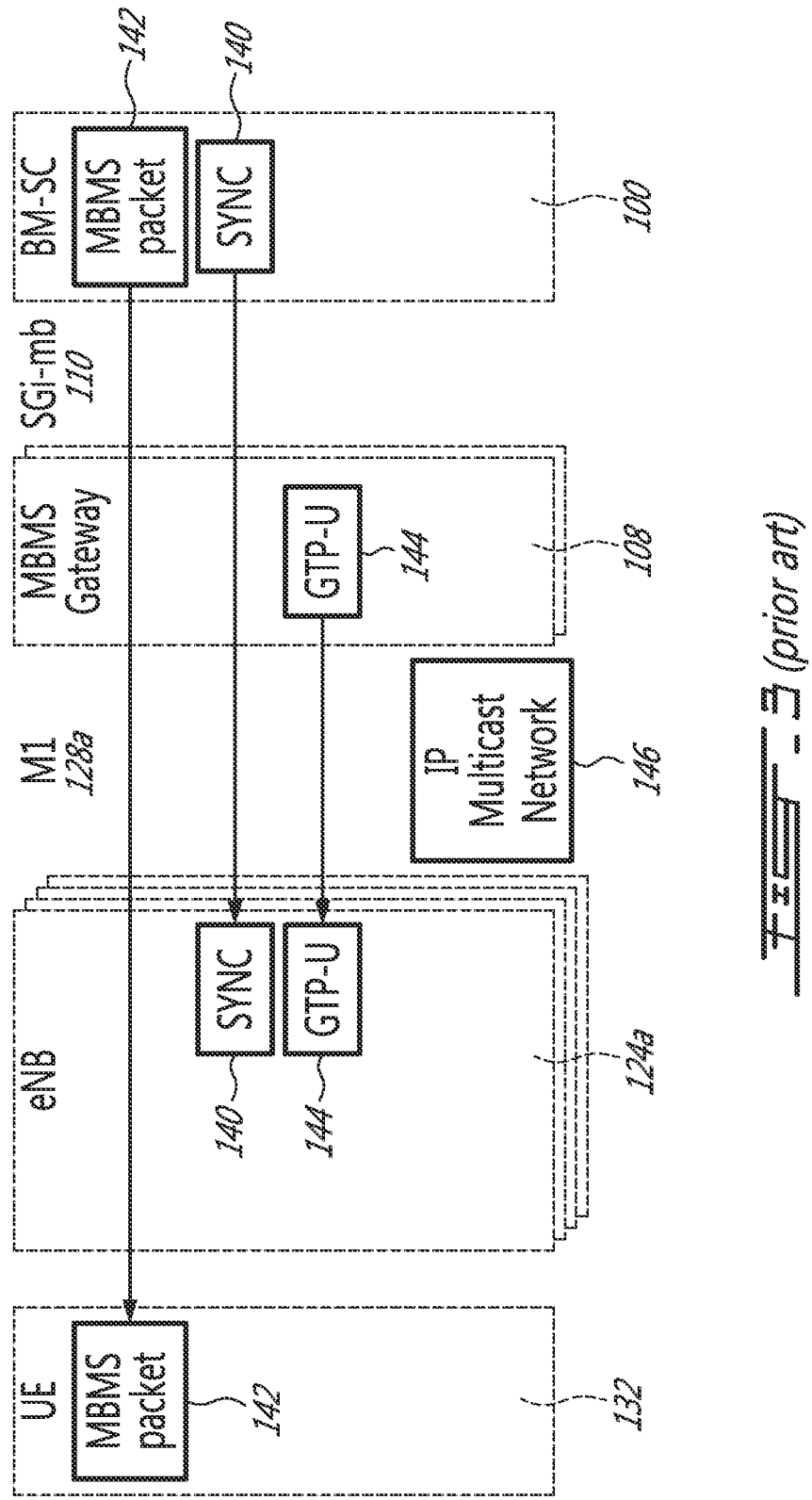
FIG. 3 is an example embodiment of data traffic in an LTE network.

In the example network architecture of FIG. 1, this can be achieved by the MCE 122a (co-located on eNB 124a) sending the fault indication message along the M3 CP interface 126a directly to the MME 114. In the example network architecture of FIG. 2, this can be achieved by the eNB 124a sending the fault indication message along the M2 CP interface 136a to the centralized MCE 134. MCE 134 forwards the fault indication message along the M3 CP interface 126c to the MME 114.

Figure 5:
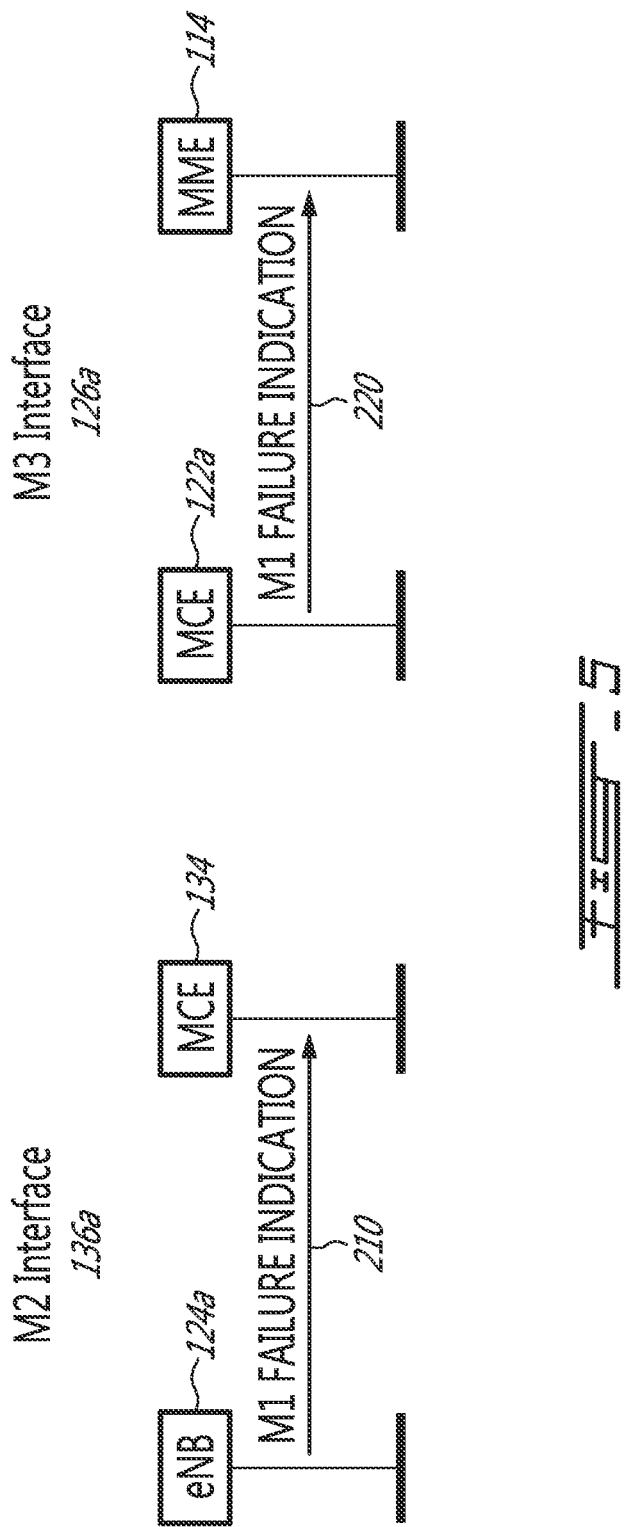
FIG. 5 is a signaling diagram for conveying fault indication.

FIG. 5 is a signaling diagram illustrating example signaling for fault indication. Using the M2 interface 136a, eNB 124a sends an M1 FAILURE INDICATION message 210 to the MCE 134. Using the M3 interface 126a, MCE 122a sends an M1 FAILURE INDICATION message 220 to the MME 114.

In some embodiments, no response from the MCE and/or the MME is required upon receipt of the fault indication message. This may further reduce the network signaling overhead.

Thus, it will be appreciated by those skilled in the art that embodiments of the present invention provide an indication of a user plane fault using the control plane signaling interface. This is to be contrasted with conventional approaches in which a fault is indicated along a dedicated Operations, Administration and Management (OAM) link to an OAM or FM module of a Network Management System (NMS). Such dedicated links are typically low bandwidth, such that the link and indeed the OAM module may be saturated or overwhelmed by a cascade of fault indications or an alarm storm, such as may be experienced in the event of a catastrophic network failure.

The use of the control plane signaling interface can further assist in managing fault indications to mitigate the likelihood of an alarm signaling storm.

In some embodiments, an eNB may detect a loss of connectivity for a plurality of different MBMS bearers. In such a scenario, the eNB can bundle a plurality of loss of connectivity indications into a smaller number of messages. For example, a fault indication message may be capable of accommodating up to 256 bearer fault indications. In order to take advantage of this bundling capability, in some embodiments, the eNB may be configured to wait a period of time (on the order of a few seconds, for example), in order to potentially accumulate a plurality of loss of connectivity indications for reporting in a single fault indication message. Despite such configuration, it is feasible, especially in the case of a catastrophic network failure, that an eNB can send a plurality of fault indication messages to the MME.

In some embodiments, the interval between transmitting consecutive fault indication messages can be set so as to mitigate the likelihood that the MCE and/or the MME becomes overloaded. In some embodiments, a minimum of 60 seconds between transmissions for a given message type by an eNB may be appropriate.

However few or many fault indication messages are sent and how frequently, upon receipt by the MME, each of these messages are processed. Such processing can include a logging function in which the eNB and in some example embodiments, the MBMS bearer(s) for which faults were indicated are recorded.

In some embodiments, the processing by the MME can include incrementing one or more network-wide MBMS connectivity counters. Such counters can include the total number of MBMS bearer services impacted by a fault and the total number of eNBs impacted by a fault, without necessarily identifying whether the faults are related.

In some embodiments, the processing by the MME can include generating an alarm towards the FM or OAM system for one or more of the fault indication messages. When there are only a few or isolated fault indication messages, an alarm may be generated for each message and/or for each specific MBMS bearer service associated therewith. When, however, a large number of MBMS bearers and/or a large number of eNBs are impacted, such that a large number of fault indication reports are received by the MME, the MME may determine only to send a subset, for instance, by way of non-limiting example, ten, of the possible alarms to the FM or OAM system so as to avoid an alarm storm that may saturate the dedicated OAM links.

However many of the alarms are generated, each alarm may provide information about the affected eNB(s) and MBMS bearer(s). In some embodiments, the alarm text may state that connectivity to the MBMS bearer service <TMGI>, for eNodeB <eNodeB_Identifier> is lost, where TMGI is a Temporary Mobile Group Identity that uniquely identifies the MBMS bearer and eNodeB_Identifier uniquely identifies the eNB.

In some embodiments, the alarm text may include the (S,G) address pair that uniquely identifies the associated SSM channel.

As discussed herein, in some embodiments, an eNB can further detect connectivity recovery. In such embodiments, upon detecting connectivity recovery, the eNB can send a fault recovery message such as, by way of non-limiting example, an M1 RECOVERY INDICATION message, to the MME in a manner and in circumstances similar to the fault indication messages described with respect to FIG. 5. Similarly, upon receipt, the MME may process the received fault recovery message(s) in a manner and in circumstances similar to the fault indication message discussed above.

In some embodiments, the processing by the MME can include clearing the alarms towards the FM or OAM system for one or more of the repair indication messages.

Figure 6:
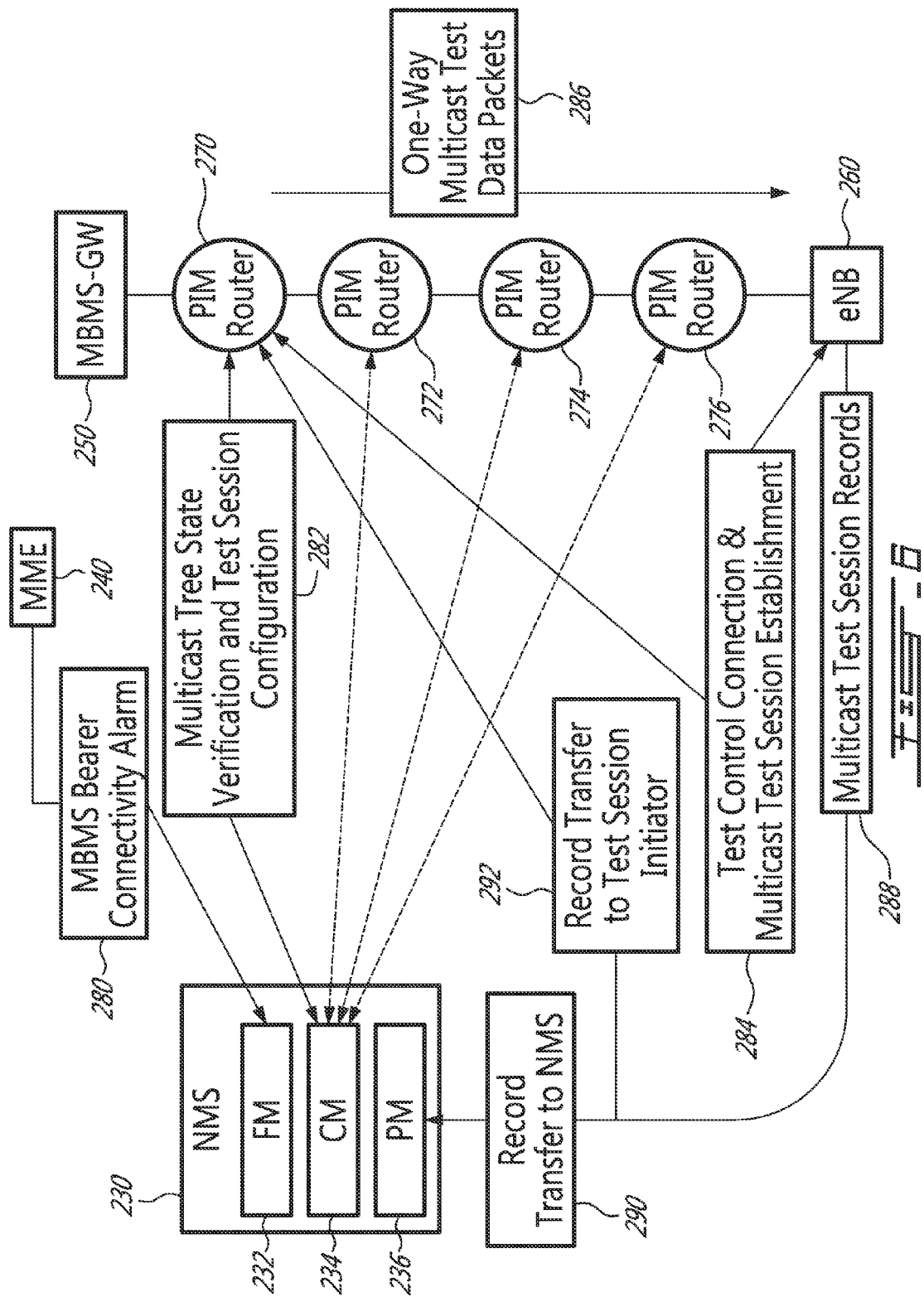
FIG. 6 illustrates an example method for fault localization.

FIG. 6 illustrates an example method for fault localization. The embodiment of FIG. 6 can be implemented by an OAM or FM module initiating a multicast test session for localizing at least one fault in an IP multicast network after receiving an MBMS bearer alarm or notification.

As discussed herein, MBMS networks make use of a unidirectional path tree from the MBMS-GW to each eNB subscribing to an MBMS bearer session and, ultimately, to one or more UEs connected by a Uu interface to an eNB. For this reason, conventional methods involving BFD are not easily amenable to fault localization in MBMS networks.

FIG. 6 includes example Network Management System (NMS) 230, MME 240, MBMS-GW 250, eNB 260, and a number of PIM Routers 270, 272, 274, 276 entities according to embodiments of the present invention. The NMS 230 can optionally include a number of modules such as a fault management (FM) module 232, a configuration management (CM) module 234, and/or a performance management (PM) module 236.

Upon reception of an MBMS bearer connectivity alarm (step 280) from MME 240, the NMS 230 can correlate the alarm with any other related alarms received and identifies a PIM router 270 that may be suitable for transmitting one-way multicast test packets toward the eNB 260 that detected a fault reported in the received MBMS bearer connectivity alarm 280, along a portion of the SSM channel associated with the MBMS bearer session with which the alarm is associated.

When the PIM router 270 has been identified, the NMS 230 verifies the (S,G) multicast tree state for the selected PIM router and configures a one-way multicast test session (step 282) using the unicast source address S and the multicast destination address G, but using a UDP socket P at the eNB 260 that is different from the socket used for terminating all GTP multicast tunnels at the eNBs, which may, in some example embodiments, be UDB port 2152 in accordance with TS 29.281. Accordingly, the eNB 260 will be able to distinguish test packets received from the multicast test session along the (S,G) multicast tree from the GTP multicast tunnel for the MBMS bearer session.

The selected PIM router 270 sets up a control connection over TCP or SCTP to the unicast address of the eNB 260 interface, and requests the establishment of a one-way multicast test session using unicast source address S, multicast destination address G and UDP destination port P (step 284). Thus, the test session employs a portion of the SSM channel associated with the MBMS bearer session with which the alarm is associated.

Optionally, the test session establishment can also include a number of multicast test packets that will be transmitted as well as a starting time and ending time for the test session.

In accordance with the test session, the selected PIM router 270 transmits a stream of multicast test packets along the portion of the SSM channel associated with the MBMS bearer session with which the alarm is associated (step 286). In some embodiments, each test packet can include a sequence number and an exit timestamp. In some embodiments, the test packet is an OWAMP test packet in unauthenticated mode with a destination IP address G, such as is described in RFC 4656.

The test packets follow the portion of the SSM channel identified toward the eNB 260. If and when the test packets are received by the eNB 260, the eNB 260 time stamps each received packet and stores the sequence number, TTL or Hop Limit and the exit and received time stamps (step 288). In some embodiments, this information can be transmitted in test records directly to the NMS 230 along a dedicated OAM link there between (step 290). In some alternative embodiments, this information may be returned to the test session initiator, for example PIM Router 270 (step 292). The test session initiator can then consolidate and transmit test records to the NMS 230 along a dedicated OAM link there between.

Thus, the NMS 230 may produce packet delay and loss metrics for the test session and determine if additional test sessions from the same, or from a different, PIM router may be appropriate in order to localize the fault. Judicious selection of appropriate PIM routers and corresponding portions of the SSM channel may permit localization of the fault with relative ease.

Figure 7:
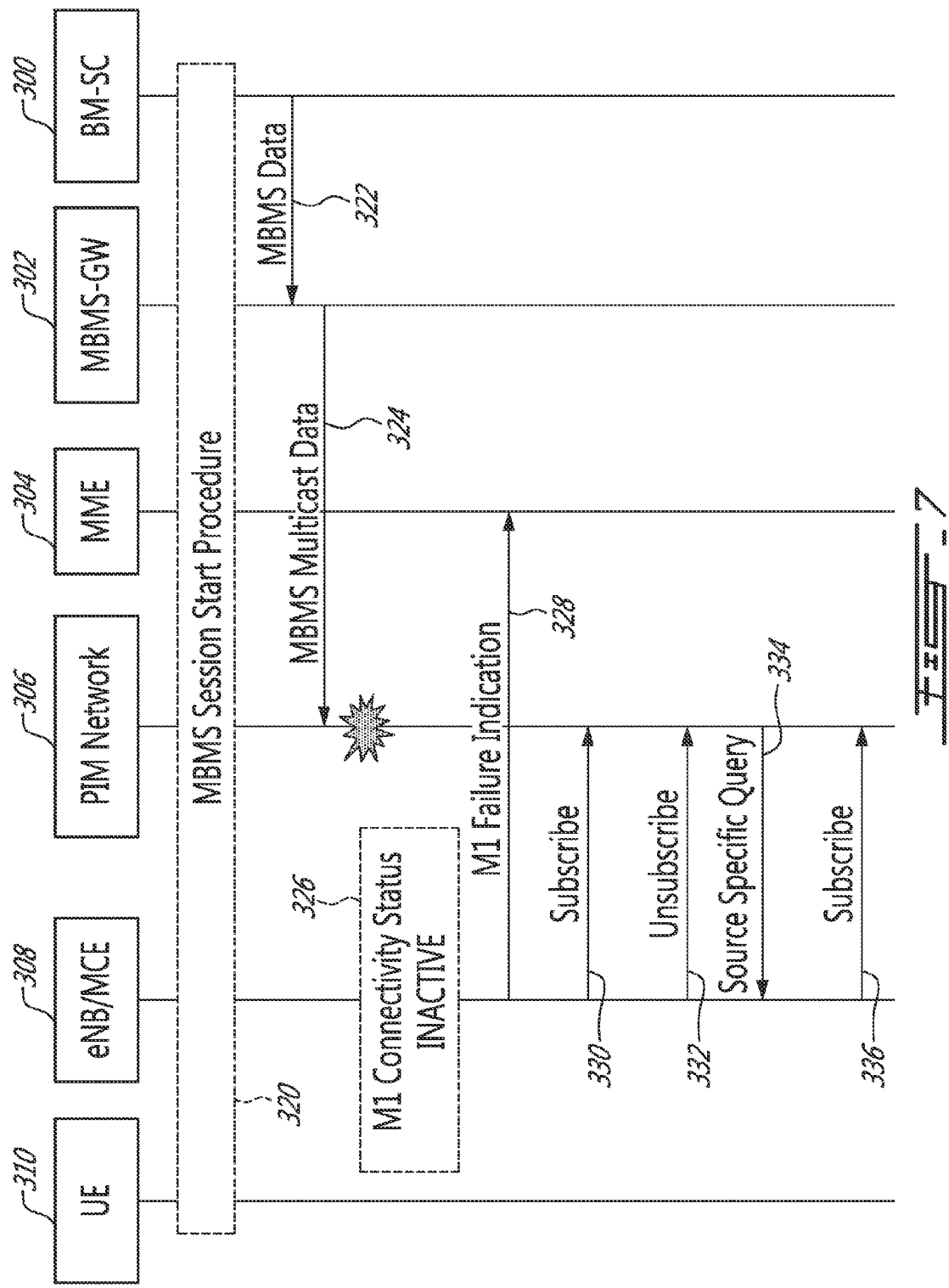
FIG. 7 illustrates an example method for fault repair.

FIG. 7 illustrates an example method for fault repair. The embodiment of FIG. 7 can include IP multicast protocol actions initiated by an eNB to assist in resolving connectivity issues within the PIM network without release of the MBMS session. FIG. 7 includes example BM-SC 300, MBMS-GW 302, MME 304, PIM Network 306, eNB/MCE 308, and UE 310 entities according to embodiments of the present invention.

Block 320 includes the protocol actions corresponding to an MBMS Session Start procedure. This can include an MBMS session start request message transmitted from the BM-SC 300 to the MBMS-GW 302 and forwarded to the MME 304 and the eNB 308. The appropriate radio access network resource can be configured (for example, with respect to UE 310) and the eNB 304 can send a subscribe message to the PIM Network 306. MBMS user plane data 322 can then be transmitted by the BM-SC 300 and multicast 324 to the PIM Network 306.

The eNB 308 can detect a fault and/or loss of connectivity using the methodology as described herein, in block 326. The eNB 308 can transmit an M1 failure indication message 328 to the MME 304. In some embodiments, the eNB 308 can initiate IP multicast protocol actions to attempt to repair the detected fault without releasing the faulty MBMS session.

In some embodiments, this can be accomplished by sending a subscribe message 330, such as an IGMPv3 Membership Report and/or an MLDv2 State Change Report message (including retransmissions) to the multicast PIM router immediately proximate to the eNB 308 along the SSM channel corresponding to the faulty MBMS session. The subscribe message 322 can indicate a desire to listen to the SSM channel. In some embodiments, this message may be sent automatically. In some embodiments, this message may be sent manually upon user command.

This subscribe request 330 mimics, albeit in the course of an established MBMS session, the scenario where the MBMS session has just been created and/or where the multicast listening state on the eNB 308 interface has changed, both of which are well understood and described in RFC 3376 and/or RFC 3810 respectively. Optionally, this message can contain the same information as originally transmitted when the MBMS session was initially established (e.g. in block 320). This information can include a Source List Change Record with Record Type 5 (ALLOW_NEW_SOURCES), with the Source Address=S and the Multicast Address=G.

The subscribe message 330 is intended to trigger the PIM router to take action and update any existing Multicast Address Listener state in the router. Upon receiving such message, the PIM router should also send a corresponding PIM (S,G) Join message towards the next immediately upstream PIM router in the PIM Network 306.

Should the loss of connectivity persist, the eNB 308 may thereafter send an unsubscribe message 332. Unsubscribe 332 can include an IGMPv3 Membership Report and/or an MLDv2 State Change Report message (including retransmissions) to the multicast PIM router immediately proximate to eNB 308 along the SSM channel corresponding to the faulty MBMS session. The unsubscribe message 332 can indicate a desire to no longer listen to the SSM channel and to do so without releasing the MBMS session. In some embodiments, this message may be sent automatically. In some embodiments, this message may be sent manually upon user command. In some embodiments, unsubscribe message 332 includes a Source List Change Record with Record Type 6 (BLOCK_OLD_SOURCE), with the Source Address=S and the Multicast Address=G.

This action is intended to trigger the PIM router to query for other possible listeners on the attached link and eventually delete the multicast address its Multicast Address Listener state. Upon receiving such message, the PIM router should also send a corresponding PIM (S,G) Prune message towards the next immediately upstream PIM router in the PIM Network 306.

The PIM router, acting as the querying entity, can optionally send a Source Specific Query message 334 to verify whether there are other listeners for that same source on the link, or not. If a response that includes this source is received before the timer expiration, all multicast routers on the link can update the source timer. If no response is received, the source is deleted from the Include List. The Include List is a set of sources that one or more listeners on the link have requested to receive. Any other source that is not in the Include List can be blocked by the router. In some embodiments, the Source Specific Query 334 can include the Source Address=S and the Multicast Address=G.

After a period of time, the eNB 308 may subscribe again to the SSM channel with subscribe message 336. Subscribe 336 can include an IGMPv3 Membership Report and/or an MLDv2 State Change Report message (including retransmissions) to the multicast PIM router immediately proximate to eNB 308 along the SSM channel corresponding to the faulty MBMS session, indicating a desire to listen to the SSM channel. This request mimics, albeit in the course of an established MBMS session, the scenario where the MBMS session has just been created, which is well understood and described in RFC 3376 and/or RFC 3810 respectively.

In some embodiments, subscribe message 336 can contain the same information as originally transmitted when the MBMS session was initially established. This information can include a Source List Change Record with Record Type 5 (ALLOW_NEW_SOURCES), with the Source Address=S and the Multicast Address=G. This action is intended to remove and rebuild the (S, G) multicast state and distribution tree without impacting the MBMS session rate.

Figure 8:
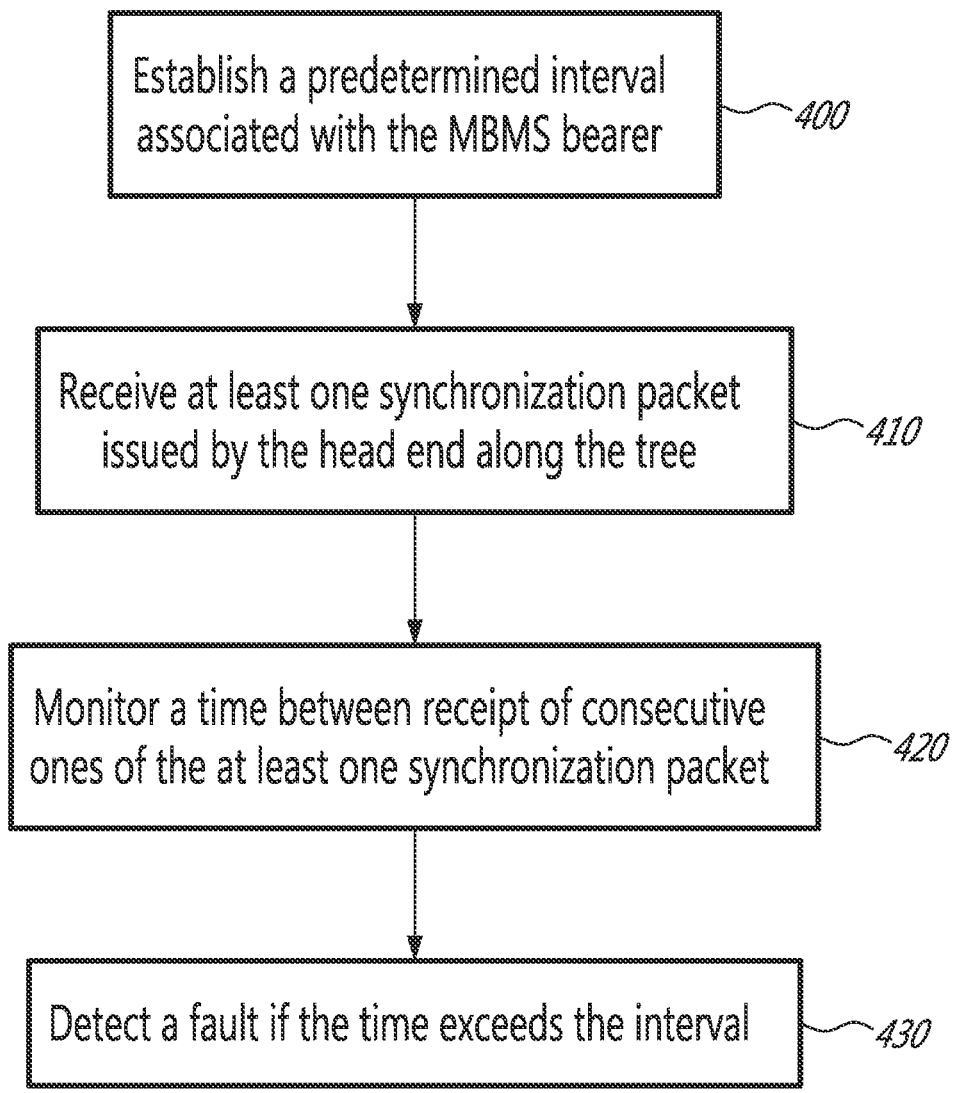
FIG. 8 is a flow chart illustrating a method for detecting a fault.

FIG. 8 is a flow chart illustrating a method for detecting a fault along a user plane for a MBMS bearer session established along a unidirectional distribution tree emanating from a head end. The method can be performed by a node at a tail end of the tree subscribing to the multicast session. The tail end node, or destination node, can be an eNB as has been described herein.

The method begins by establishing, or configuring, a predetermined time interval associated with the MBMS bearer (block 400). The time interval can be defined in accordance with an MBMS SYNC synchronization sequence. The interval can be set to be equal to, or to exceed a multiple of the MBMS SYNC synchronization sequence. In some embodiments, the multiple can be three. The MBMS SYNC synchronization sequence can indicate an expected periodicity of receipt of synchronization packets by the tail end node.

At least one synchronization packet, issued by the head end along the multicast distribution tree, is received by the tail end node (block 410). The synchronization packets can be SYNC PDUs selected from a group consisting of: SYNC user data PDUs (Type 0), SYNC control PDUs (Type 0), SYNC control PDUs (Type 3) and/or any combination of any of these. In some embodiments, a synchronization packet is transmitted at the end of a synchronization sequence regardless of bearer activity.

The time between receipt of consecutive ones of the synchronization packets is monitored (block 420). The action of monitoring can include resetting a timer upon receipt of each of the at least one synchronization packets. The timer can be a countdown timer set to the established interval.

A fault along the user plane is detected if the time between the receipt of consecutive synchronization packets exceeds the interval (block 430). The action of detecting can include determining that the timer has counted down to zero. In some embodiments, the detected fault is indicated by a fault indication message transmitted by the tail end node to a management entity.

In an optional embodiment, after the action of detecting (block 430), the method can include receiving additional synchronization packets issued by the head end along the tree. The number of received additional packets can be counted, and a fault recovery can be declared if the counted number exceeds a predetermined threshold of received additional packets. In some embodiments, the threshold can be three additional packets. In some embodiments, the fault recovery is indicated by a fault recovery message transmitted by the tail end node to a management entity.

Figure 9:
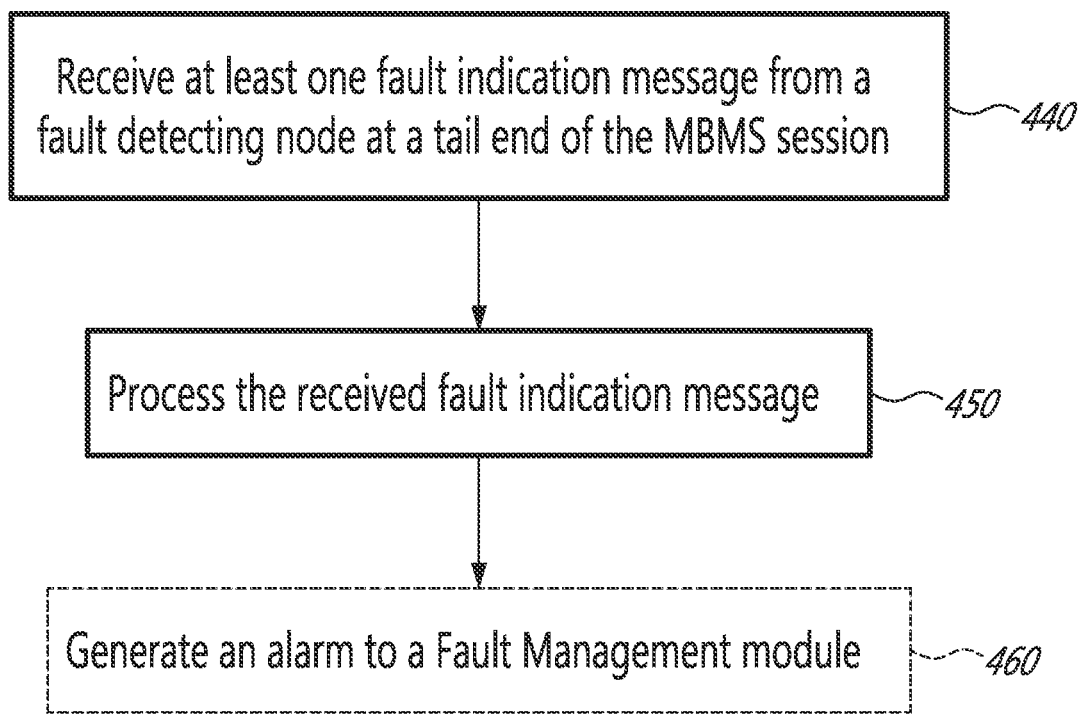
FIG. 9 is a flow chart illustrating a method for indicating a fault.

FIG. 9 is a flow chart illustrating a method for indicating a fault along a user plane of a MBMS bearer session established along a unidirectional distribution tree emanating from a head end. The method can be performed by a monitoring node. The monitoring node can be an MME or a MCE node as have been described herein.

In some embodiments, the method of FIG. 9 can be performed following the detection of a fault such as, by way of non-limiting example, was illustrated in FIG. 8.

The method begins by receiving at least one fault indication message from a fault detecting node at a tail end of the tree subscribing to the session along a signaling interface between the fault detecting node and the monitoring node (block 440). The fault indication message(s) can report at least one identifier selected from a group consisting of the MBMS bearer, the fault detecting node, a Source-Specific Multicast (SSM) channel extending between the head end and the fault detecting node, and any combination of any of these. In some embodiments, a fault indication message can correspond to a plurality of faults detected by the fault detecting node. The plurality of faults can correspond to a common MBMS bearer. The plurality of faults can correspond to detected faults that are separated in time.

The received fault indication message(s) is processed by the monitoring node (block 450). The action of processing can include an activity selected from a group consisting of: incrementing a counter of a total number of MBMS bearer services impacted by a fault, incrementing a counter of a total number of fault detecting nodes impacted by a fault and/or any combination of any of these.

Optionally, at least one alarm can be generated, by the monitoring node, to a Fault Management module along a dedicated alarm interface extending there between (block 460). The action of generating can include an activity selected from a group consisting of: consolidating a plurality of fault indication messages into a single alarm, separating alarms in time, dispensing with generating an alarm for at least one fault indication message and/or any combination of any of these. In some embodiments, the monitoring node may node generate an alarm. For example, if a large number of MBMS sessions/bearers have been impacted by a failure or if a large number of eNBs have detected a loss of connectivity, only a subset of the received failure indications may be reported to the Fault Management module.

Figure 10:
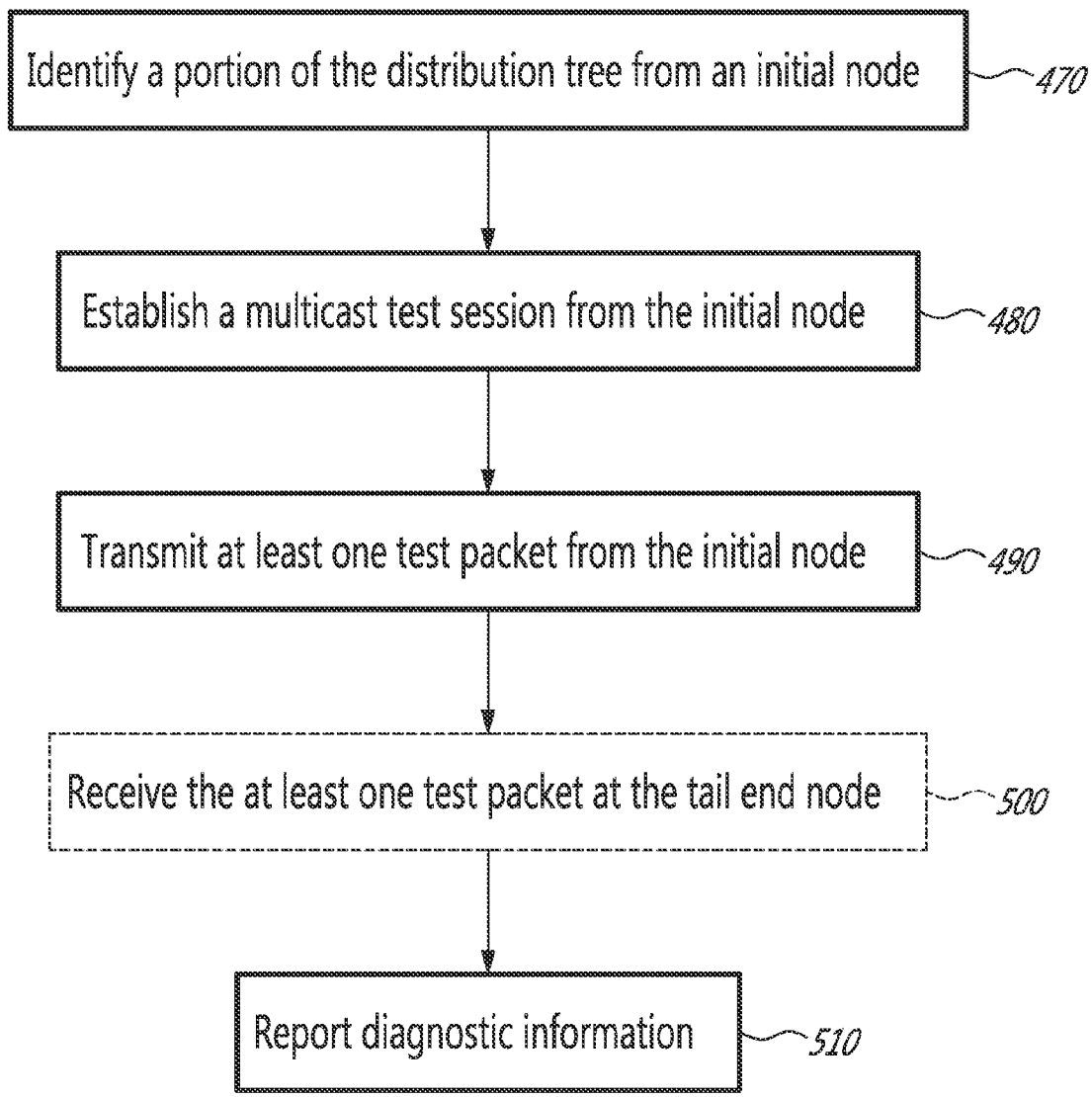
FIG. 10 is a flow chart illustrating a method for localizing a fault.

FIG. 10 is a flow chart illustrating a method for localizing a fault along a user plane of a MBMS bearer session established along a unidirectional distribution tree emanating from a head end and terminating at a tail end node of the tree subscribing to the session. The method of FIG. 10 can be implemented by a management entity such as a NMS as has been described herein.

In some embodiments, the method of FIG. 10 can be performed following the detection of a fault such as, by way of non-limiting example, was illustrated in FIG. 8. In some embodiments, the method of FIG. 10 can be performed following, or in combination with, a fault indication procedure such as, by way of non-limiting example, was illustrated in FIG. 9.

The method begins by identifying a portion of the distribution tree from an initial node along the tree intermediate the head end and the tail end node to the tail end node (block 470). In some embodiments, the distribution tree can comprise a Source-Specific Multicast (SSM) channel extending between the head end and the tail end node. In some embodiments, the initial node is a Protocol Independent Multicast (PIM) router.

A one-way multicast test session is then established from the initial node using identifiers corresponding to the head end and the tail end node and a tail end node socket different from the MBMS bearer session (block 480). In some embodiments, the tail end node socket can be any UDP socket other than UDP socket 2152. A test packet is transmitted from the initial node towards the tail end node along the established multicast test session (block 490). In the scenario where a presumed fault is not persistent, the test packet will be received by the tail end node (block 500). Diagnostic information corresponding to the received packet(s) can then be reported to a fault management system for use in localizing the fault.

Figure 11:
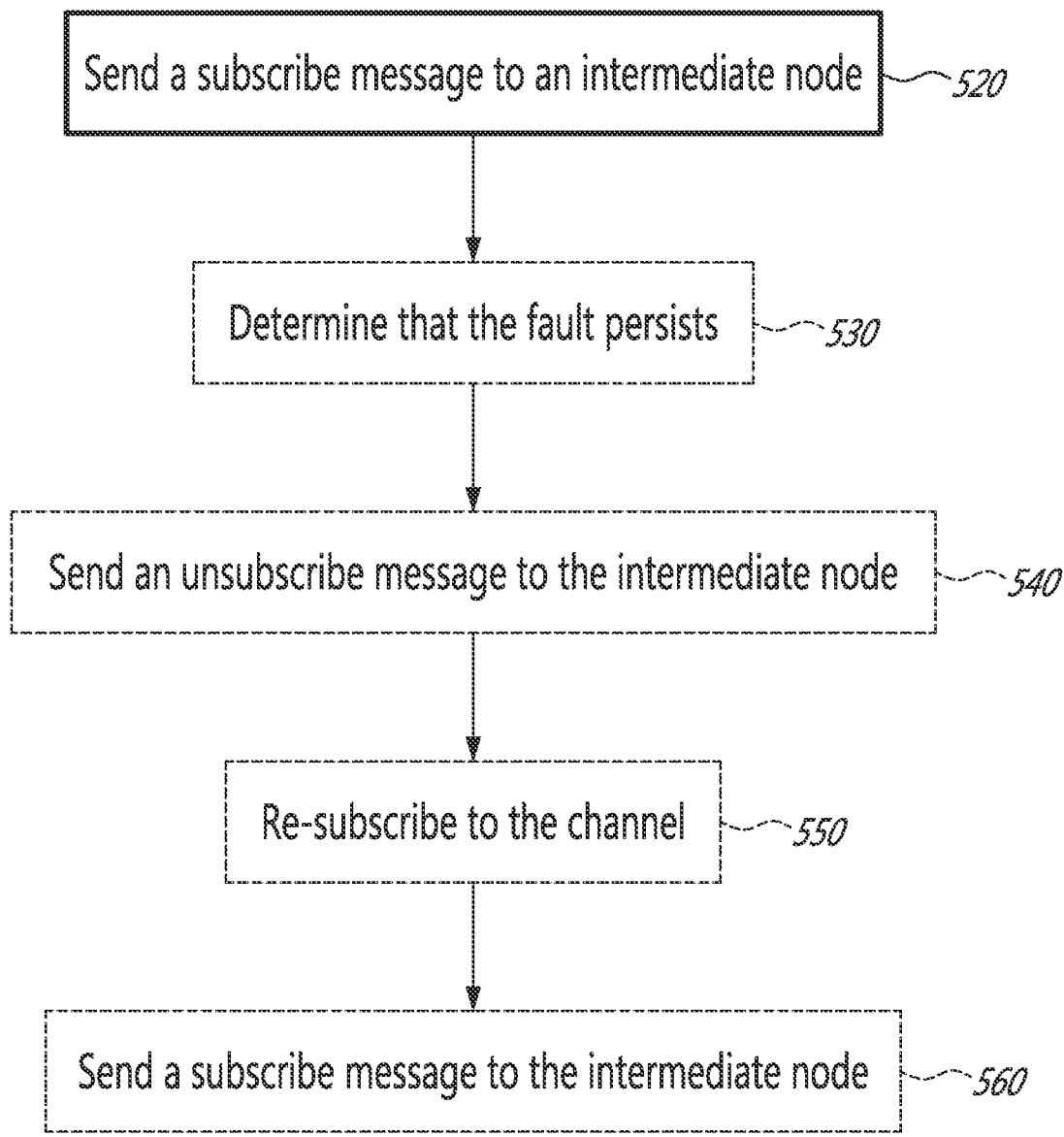
FIG. 11 is a flow chart illustrating a method for repairing a fault.

FIG. 11 is a flow chart illustrating a method for repairing a fault along a user plane of a MBMS bearer session established along a unidirectional distribution tree describing a source-specific multicast (SSM) channel associated with the session, emanating from a head end and terminating at a tail end node of the tree subscribing to the session. The method of FIG. 11 can be implemented by a tail end node, or a destination node, such as an eNB as has been described herein.

In some embodiments, the method of FIG. 11 can be performed following the detection of a fault such as, by way of non-limiting example, was illustrated in FIG. 8. In some embodiments, the method of FIG. 11 can be performed following, or in combination with, a fault indication procedure such as, by way of non-limiting example, was illustrated in FIG. 9. In some embodiments, the method of FIG. 11 can be performed following, or in combination with, a fault localization procedure such as, by way of non-limiting example, was illustrated in FIG. 10.

As discussed, the actions described in the embodiment of FIG. 11 can be performed in response to an eNB detecting a fault on the user plane interface of the MBMS bearer. The method of FIG. 11 can include the eNB initiating at least one IP multicast channel membership action(s) without releasing the MBMS bearer.

The method begins by sending a subscribe message to an intermediate node (block 520). The intermediate node can be a neighboring multicast router that is immediately upstream along the distribution tree. The subscribe message can be a start listening message which can request that the intermediate node listen to the multicast channel (the SSM channel). The subscribe message can further trigger the intermediate node to send a join message towards a next upstream node.

In some optional embodiments, the tail end node can determine that the user plane fault persists (block 530). The tail end node can send a sending an unsubscribe message to the intermediate node (block 540). The unsubscribe message can be a stop listening message requesting that the intermediate node no longer listen to the multicast channel. The tail end node can then initiate re-subscribing to the multicast channel (block 550). This can include sending a second subscribe message to the intermediate node (block 560) requesting that the intermediate node restart listening to the multicast channel. In some embodiments, the transmitted messages can be selected from a group consisting of: an IGMPv3 Membership Report, an MLDv2 State Change Report Stage, and/or any combination of any of these.

Figure 12:
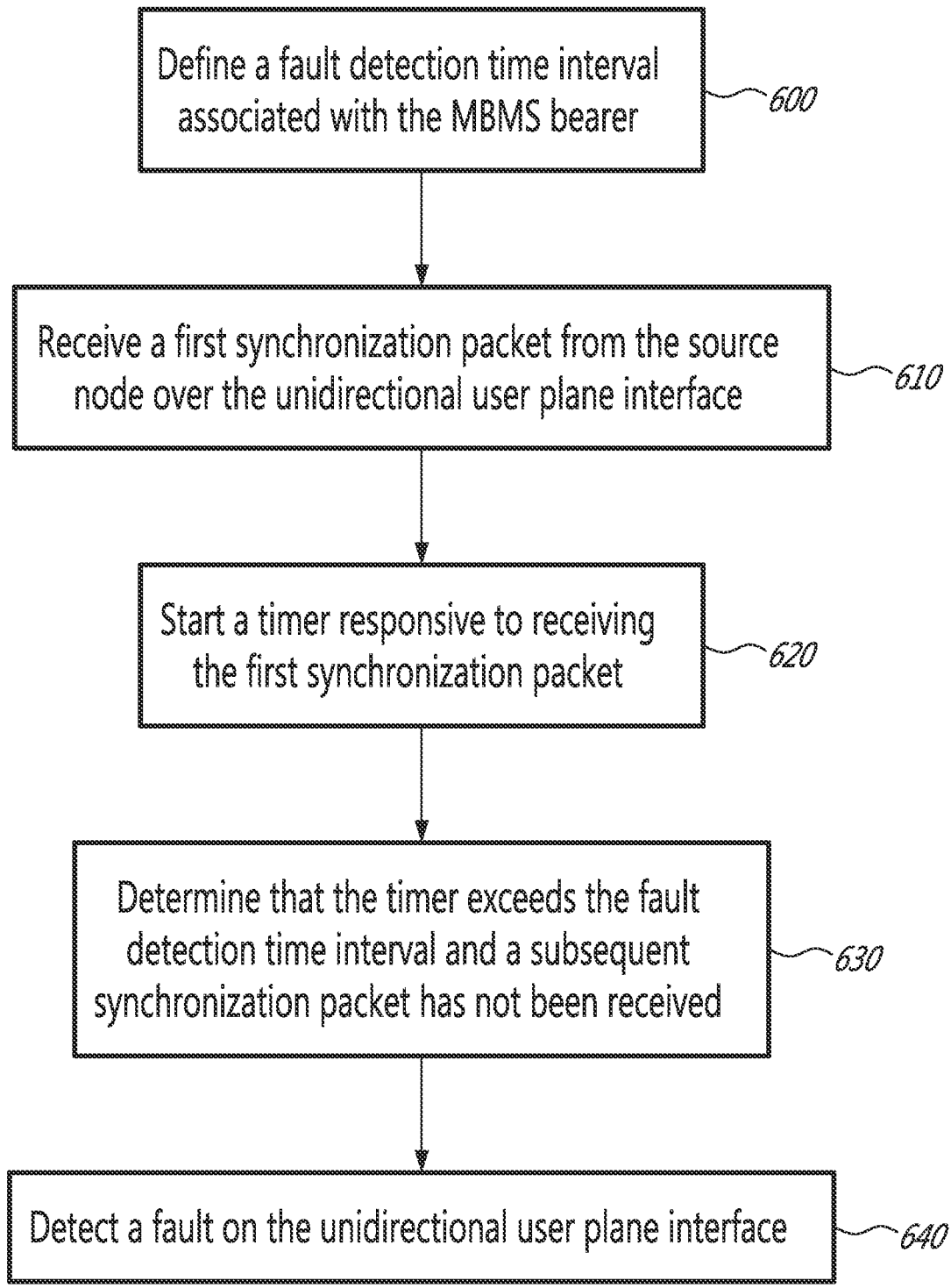
FIG. 12 is a flow chart illustrating a method for fault management.

FIG. 12 is a flow chart illustrating a method for fault management on a unidirectional user plane interface of a MBMS bearer for point-to-multipoint delivery of MBMS traffic from a source node to at least one destination node. The method of FIG. 12 can be implemented by a destination node, such as an eNB as has been described herein.

The method begins by defining a fault detection time interval associated with the MBMS bearer (block 600). The fault detection time interval can be defined in accordance with an MBMS SYNC synchronization sequence. In some embodiments, the fault detection time interval can be defined to exceed a multiple of the MBMS SYNC synchronization sequence.

The destination node can monitor for receipt of synchronization packets. A first synchronization packet is received from the source node over the unidirectional user plane interface (block 610). The first synchronization packet can be a SYNC control protocol data unit (SYNC PDU) Type 0 or Type 3. In some embodiments, the first synchronization packet can be received over the unidirectional user plane interface regardless of the MBMS bearer activity. A timer is started in response to receiving the first synchronization packet (block 620). In some embodiments, the timer can be reset in response to receiving a subsequent second synchronization packet from the source node over the unidirectional user plane interface.

The destination node determines that the timer exceeds the fault detection time interval and that a subsequent synchronization packet has not been received during the fault detection time interval (block 630). In response to this determination, a fault is detected on the unidirectional user plane interface (block 640).

In some embodiments, responsive to detecting the fault on the unidirectional user plane interface, a fault indication message is transmitted to a mobility management entity over a control plane interface. The fault indication message can be transmitted to the mobility management entity for correlation with at least one other fault indication message. The mobility management entity can use the fault indication message to generate a reduced number of fault notifications associated with the MBMS bearer to a network management entity, such as an NMS.

In an optional embodiment, following the fault detection, the destination node can receive additional synchronization packets over the unidirectional user plane interface. The destination node can count a number of received additional synchronization packets. The destination node can further detect a fault recovery of the unidirectional user plane interface in response to determining that the counted number exceeds a predetermined threshold of received additional synchronization packets. In some embodiments, responsive to detecting the fault recovery, a fault recovery message can be transmitted to a mobility management entity over a control plane interface.

In another optional embodiment, responsive to detecting the fault on the unidirectional user plane interface, the destination node can initiate at least one IP multicast channel membership action without releasing the MBMS bearer. A first IP multicast channel membership action can include sending a subscribe message to a neighboring multicast router requesting to listen to the IP multicast channel associated with the MBMS bearer. The subscribe message can be an IGMPv3 Membership Report or an MLDv2 State Change Report Stage. The subscribe message can be sent to trigger the neighboring multicast router to update its multicast address listener state and to send a join message towards a next upstream multicast router.

In some embodiments, a second IP multicast channel membership action can include sending an unsubscribe message to a neighboring multicast router requesting to stop listening to the IP multicast channel associated with the MBMS bearer. The second IP multicast channel membership action can also include sending, after waiting a predetermined period of time, a second subscribe (e.g. re-subscribe) message to the neighboring multicast router requesting to listen to the IP multicast channel associated with the MBMS bearer. The unsubscribe and re-subscribe messages can be an IGMPv3 Membership Report or an MLDv2 State Change Report Stage. The unsubscribe message can be sent to trigger the neighboring multicast router to delete its multicast address listener state and to send a prune message towards a next upstream multicast router. The second subscribe message cane be sent to trigger the neighboring multicast router to re-create its multicast address listener state and to send a join message towards a next upstream multicast router.

Figure 13:
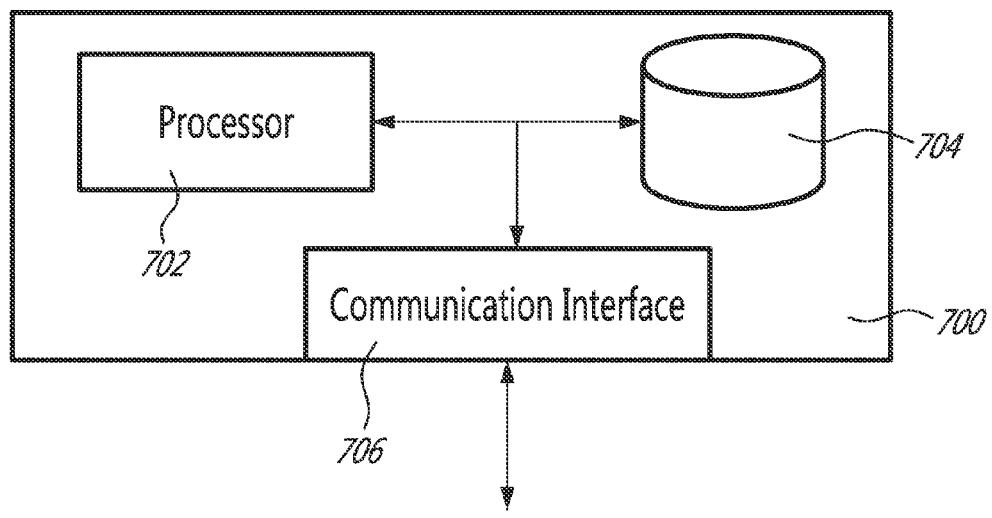
FIG. 13 is a block diagram illustrating an example network node.

FIG. 13 is a block diagram illustrating an example network node 700 according to embodiments of the present invention. Network node 700 can be any one or more of the network entities or elements, as described herein. In some embodiments, network node 700 can be a tail end node, a destination node or an eNB configured to perform the functions of any or all of the various embodiments as described herein.

The network node 700 includes a processor 702, a memory or instruction repository 704 and a communication interface 706. The communication interface 706 can include at least one input port and at least one output port. The memory 704 contains instructions executable by the processor 702 whereby the network node 700 is operable to perform the various embodiments as described herein. In some embodiments, the network node 700 can be a virtualized application hosted by the underlying physical hardware.

Network node 700 can be configured to manage faults on a unidirectional user plane interface of a MBMS bearer for point-to-multipoint delivery of MBMS traffic from a source node to at least one destination node. Network node 700 can be configured to define a fault detection time interval associated with the MBMS bearer. Network node 700 can be configured to start a timer responsive to receiving a first synchronization packet from the source node over the unidirectional user plane interface. Network node 700 can be configured to detect a fault on the unidirectional user plane interface responsive to determining that the timer exceeds the fault detection time interval and a subsequent synchronization packet has not been received during the fault detection time interval.

Figure 14:
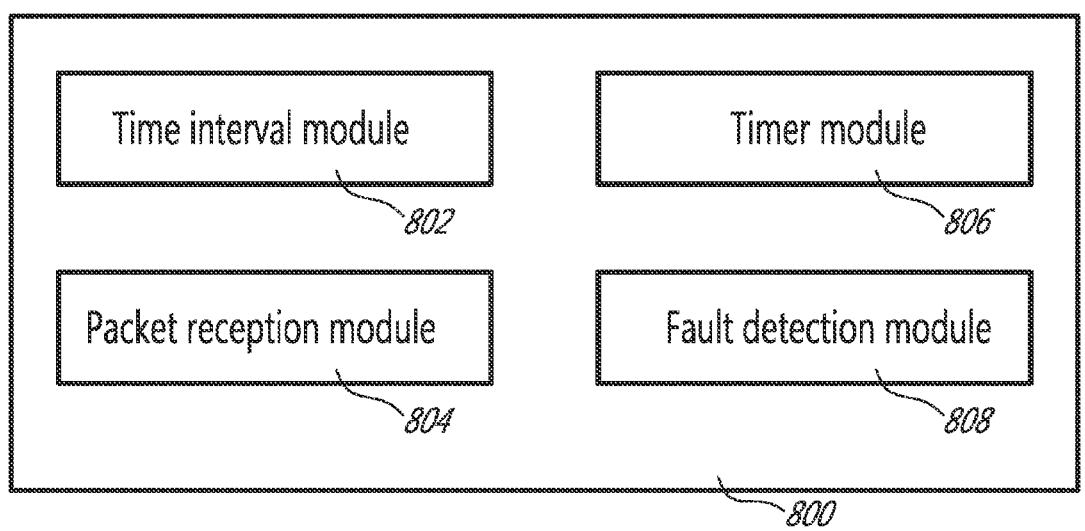
FIG. 14 is a block diagram of a fault manager entity.

FIG. 14 is a block diagram of a fault manager entity 800 that can include a plurality of modules including, but not limited to, a time interval module 802, a packet reception module 804, a timer module 806 and a fault detection module 808. Time interval module 802 is configured to define a fault detection time interval associated with an MBMS bearer. Packet reception module 804 is configured to receive a first synchronization packet from a source node over a unidirectional user plane interface. Timer module 806 is configured to start a timer responsive to receiving the first synchronization packet. Fault detection module 808 is configured to detect a fault on the unidirectional user plane interface responsive to determining that the timer exceeds the fault detection time interval and a subsequent synchronization packet has not been received during the fault detection time interval.

Embodiments of the invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for fault management on a unidirectional user plane interface of a Multimedia Broadcast/Multicast Service (MBMS) bearer for point-to-multipoint delivery of MBMS traffic from a source node to at least one destination node, the method performed by a destination node and comprising:
   defining a fault detection time interval associated with the MBMS bearer;
   starting a timer responsive to receiving a first synchronization packet from the source node over the unidirectional user plane interface; and
   detecting a fault on the unidirectional user plane interface responsive to determining that the timer exceeds the fault detection time interval and a subsequent synchronization packet has not been received during the fault detection time interval.

2. The method claim 1, wherein the fault detection time interval is defined in accordance with an MBMS SYNC synchronization sequence.

3. The method of claim 2, wherein the fault detection time interval is defined to exceed a multiple of the MBMS SYNC synchronization sequence.

4. The method of claim 1, further comprising, resetting the timer responsive to receiving a second synchronization packet, from the source node, over the unidirectional user plane interface.

5. The method of claim 1, wherein the first synchronization packet is a SYNC control protocol data unit (SYNC PDU) Type 0 or Type 3.

6. The method of claim 1, wherein the first synchronization packet is received over the unidirectional user plane interface regardless of MBMS bearer activity.

7. The method of claim 1, further comprising:
   responsive to detecting the fault on the unidirectional user plane interface, transmitting a fault indication message to a mobility management entity over a control plane interface.

8. The method of claim 7, wherein the fault indication message is transmitted to the mobility management entity for correlation with at least one other fault indication message.

9. The method of claim 7, wherein the fault indication message is transmitted to the mobility management entity for generating a reduced number of fault notifications associated with the MBMS bearer to a network management entity.

10. The method of claim 1, further comprising:
    receiving additional synchronization packets over the unidirectional user plane interface after detecting the fault;
    counting a number of received additional synchronization packets; and
    detecting a fault recovery of the unidirectional user plane interface in response to determining that the counted number exceeds a predetermined threshold of received additional synchronization packets.

11. The method of claim 10, further comprising:
    responsive to detecting the fault recovery, transmitting a fault recovery message to a mobility management entity over a control plane interface.

12. The method of claim 1, further comprising, responsive to detecting the fault, initiating at least one IP multicast channel membership action without releasing the MBMS bearer.

13. The method of claim 12, wherein a first IP multicast channel membership action includes sending a subscribe message to a neighboring multicast router requesting to listen to the IP multicast channel associated with the MBMS bearer.

14. The method of claim 13, wherein the subscribe message is selected from a group consisting of an IGMPv3 Membership Report and an MLDv2 State Change Report Stage.

15. The method of claim 13, wherein the subscribe message is sent to trigger the neighboring multicast router to update its multicast address listener state and to send a join message towards a next upstream multicast router.

16. The method of claim 12, wherein a second IP multicast channel membership action includes:
    sending an unsubscribe message to a neighboring multicast router requesting to stop listening to the IP multicast channel associated with the MBMS bearer; and
    sending, after a predetermined period of time, a second subscribe message to the neighboring multicast router requesting to listen to the IP multicast channel associated with the MBMS bearer.

17. The method of claim 16, wherein the unsubscribe message and the second subscribe message are selected from a group consisting of an IGMPv3 Membership Report and an MLDv2 State Change Report Stage.

18. The method of claim 16, wherein the unsubscribe message is sent to trigger the neighboring multicast router to delete its multicast address listener state and to send a prune message towards a next upstream multicast router.

19. The method of claim 16, wherein the second subscribe message is sent to trigger the neighboring multicast router to re-create its multicast address listener state and to send a join message towards a next upstream multicast router.

20. A network node for managing faults on a unidirectional user plane interface of a Multimedia Broadcast/Multicast Service (MBMS) bearer for point-to-multipoint delivery of MBMS traffic from a source node to at least one destination node, the network node comprising a processor and a memory, the memory containing instructions executable by the processor whereby the processor is operative to:
    define a fault detection time interval associated with the MBMS bearer;
    start a timer responsive to receiving a first synchronization packet from the source node over the unidirectional user plane interface; and
    detect a fault on the unidirectional user plane interface responsive to determining that the timer exceeds the fault detection time interval and a subsequent synchronization packet has not been received during the fault detection time interval.

21. The network node of claim 20, wherein the fault detection time interval is defined in accordance with an MBMS SYNC synchronization sequence.

22. The network node of claim 20, wherein the processor is further operative to reset the timer responsive to receiving a second synchronization packet, from the source node, over the unidirectional user plane interface.

23. The network node of claim 20, wherein the first synchronization packet is received over the unidirectional user plane interface regardless of MBMS bearer activity.

24. The network node of claim 20, wherein the processor is further operative to, responsive to detecting the fault on the unidirectional user plane interface, transmit a fault indication message to a mobility management entity over a control plane interface.

25. The network node of claim 20, wherein the processor is further operative to:
    receive additional synchronization packets over the unidirectional user plane interface after detecting the fault;
    count a number of received additional synchronization packets; and
    detect a fault recovery of the unidirectional user plane interface in response to determining that the counted number exceeds a predetermined threshold of received additional synchronization packets.

26. The network node of claim 20, wherein the processor is further operative to, responsive to detecting the fault, initiate at least one IP multicast channel membership action without releasing the MBMS bearer.

27. The network node of claim 26, wherein a first IP multicast channel membership action includes sending a subscribe message to a neighboring multicast router requesting to listen to the IP multicast channel associated with the MBMS bearer.

28. The network node of claim 26, wherein a second IP multicast channel membership action includes:
    sending an unsubscribe message to a neighboring multicast router requesting to stop listening to the IP multicast channel associated with the MBMS bearer; and
    sending, after a predetermined period of time, a second subscribe message to the neighboring multicast router requesting to listen to the IP multicast channel associated with the MBMS bearer.

* * * * *